Patented Aug. 21, 1951

2,565,351

UNITED STATES PATENT OFFICE 2,565,351

PRODUCTION OF DEFLUORINATED
TRICALCIUM PHOSPHATE

Charles A. Butt, Atlanta, Ga., assignor to International Minerals and Chemical Corporation, a corporation of New York No Drawing. Application February 28, 1947,
Serial No. 731,701

5 Claims. (Cl. 23—103)

The invention relates to the manufacture of defluorinated tricalcium phosphate which is useable to good advantage in animal feeds, generally as an added ingredient thereto, for supplying any needed amount of phosphorus, and, incidentally, calcium.

The invention is of particular value in producing the above stated feeding materials or ingredients from mineral phosphates which usually occur in the form of apatite or fluorapatite. The more important natural deposits of mineral phosphates in the United States and in a great many foreign countries contain the desirable constituents calcium and phosphorus in the form of apatite or fluorapatite, the formula of which may be written as $3Ca_3(PO_4)_2$—$CaF_2$ or $Ca_{10}F_2(PO_4)_6$ or $4CaO.P_2O_5.F_2$. According to these formulae the phosphate rock, if composed wholly of fluorapatite, contains 3.77% of fluorine. Coupled with this fluorine are various impurities present in minor amounts. Concentrated Tennessee brown rock contains about 25 to 33% of total phosphorus computed as $P_2O_5$ and about 55 to 72% of bone phosphate of lime or tricalcium orthophosphate, and usually contains between about 3.0 and about 3.5% fluorine. On the other hand, Florida pebble phosphate rock contains about 75% of bone phosphate of lime and about 34% phosphorus computed as $P_2O_5$ with about 3.8% fluorine being also present. The other impurities contained in these mineral phosphates include the oxides of magnesium, sodium, potassium, iron, aluminum, silicon, $SO_3$ and $CO_2$. The amounts of combined fluorine in these various mineral phosphate rocks are so high that if fed to animals in their original mined form would produce deleterious effects. Since the fluorine has been found to be deleterious particularly to cattle, it is necessary that this fluorine be in the large part removed from the phosphate rock prior to its use as an animal feed supplement. It has been found that a fluorine percentage of not more than 0.1% in a phosphate feed supplement containing at least about 30% of $P_2O_5$ is considered acceptable at the present time. The steamed bone meal customarily fed as an animal supplement contains about 30% $P_2O_2$ and about 0.06% of fluorine or slightly more fluorine in some instances.

Because of the difficulties involved in carrying out a commercial operation involving fusion to liberate and drive off the fluorine in ground natural phosphate rock, it has been the general practice in the commercial production of defluorinated phosphate feeds to pre-treat the phosphate rock with sulfuric acid in order to convert the rock into the so-called den superphosphate. Upon heating den superphosphate, or the cured superphosphate substantially all of the fluorine content of the rock is driven off by merely calcining at the relatively low temperature of about 800° C. The treatment of the natural phosphate rock with sulfuric acid breaks up the complex molecule and drives off up to about 25% of the fluorine. The remainder of the fluorine is driven off by heating the cured superphosphate to a temperature of at least 800° C. However, in this type of process the calcium phosphate formed by the treatment with sulfuric acid is first changed from the acid or monophosphate to the metaphosphate and then as the temperature is raised the pyrophosphate is formed due to some loss of sulphate. Because the pyrophosphate is not now considered a suitable form of phosphate for stock feeding purposes, and because it is desired to produce the tricalcium orthophosphates, it has been found that by raising the calcine temperature to about 1000° C. most of the $SO_3$ from the calcium sulphate is liberated, thus increasing the ratio of calcium oxide to the $P_2O_5$ present in the mixture so as to form ultimately the tricalcium orthophosphate which has been found to be the desirable constituent for animal feed supplements.

This process, however, is quite expensive because for each ton of rock treated about the same amount of 50° Baumé sulfuric acid is employed, though the final product will contain no more available $P_2O_5$ than the original ton of phosphate rock processed. In addition, of course, the manipulative steps employed require the use of mechanical equipment for the treating, denning and curing of the superphosphate formed. The calcining step, of course, involves the use of high temperatures and is for this reason expensive as well. Furthermore, in the calcining operation, in order to produce a material having a desired percentage of $P_2O_5$, for example about 30% or better, it is necessary to drive off at least 80% of the sulfur contained in the cured superphosphate material. The fumes coming from the calciner contain not only $SO_3$ and $SO_2$ vapors, but under the initial treatment the fluorine, HF and $SiF_4$ as well. This creates a dense fog of acidic gases which are a nuisance to the surrounding community. The installation of absorption equipment to take up these harmful gases and vapors is quite expensive and economically is unjustified.

It is an object of the present invention to effectively produce a product of increased $P_2O_5$ content and solubility, while at the same time minimizing the fluorine content of the product so produced.

It is a further object of the invention to carry out an improved process for the production of animal feed supplement in which increased quantities of tricalcium orthophosphate are produced.

It is a further object of the invention to produce an improved animal feed supplement of greater assimilability by animals so far as its phosphorus and calcium contents are concerned.

The above objects, as well as others which will be apparent upon a fuller understanding of the invention hereinafter described, are obtained in a novel manner. In co-pending application Serial 670,299, filed May 16, 1946, entitled "Manufacture of Defluorinated Tricalcium Phosphate," now U. S. Patent No. 2,442,969, dated June 8, 1948, an animal feed supplement is produced by treating ground phosphate rock with a phosphoric material such as orthophosphoric acid, and calcining the mixture at a temperature of at least 1150° C. with the amount of phosphatic material being such that in the end product the mol ratio represented by the equation $$\frac{\text{Mols of } CaO + MgO + Na_2O + K_2O}{\text{Mols of } P_2O_5 - Fe_2O_3 - Al_2O_3}$$

is between about 2.7 and about 3.1.

By operating a process in accordance with these limitations and instructions, a final product of improved animal feeding qualities is produced. The fluorine content of the final product lies between about 0.05 and 0.1% while the $P_2O_5$ content of the product is about 46%, of which 45% is in the ortho form.

It has now been found, however, that an improved product over and above that produced as disclosed in the preceding paragraph is produced if a phosphate rock, prior to calcination, is treated with an amount of orthophosphoric acid or other phosphatic material and with an equal or lesser amount of sulfuric acid. The $P_2O_5$ of the product produced according to the prior process has a very low solubility in neutral ammonium citrate solution, it being: 18.4% when calcined at 1200° C., 17.4% when calcined at 1300° C., and 19.5% when calcined at 1400° C. In practicing the novel process herein described, the solubility of the product in neutral ammonium citrate is greatly increased, even to the point that about 65.4% is soluble after calcination at 1400° C.

The instant novel process offers an economical method of obtaining an improved animal food supplement. By the addition of sulfuric acid to the mixture, along with the orthophosphoric acid or other suitable phosphatic material, it is possible to reduce the amount of phosphoric acid employed in the mixture below that stated in the above identified application, and thus permits the production of a defluorinated phosphate with a higher mol ratio computed according to the above stated equation and which has the effect of producing a material containing a higher orthophosphate content and a higher citrate solubility. The amount of sulfuric acid required was found to be no more than the same weight of the phosphoric acid added to the rock. The addition of more than this amount of sulfuric acid is of no value with respect to its effect on the solubility of the final product, and the use of larger amounts of sulfuric acid serves only to increase the amount of troublesome sulfur trioxide vapor emitted during the calcination. Preferably slightly less than an equal weight of sulfuric acid to that of the phosphoric acid added is employed. The amount of phosphoric acid added is such that in the final calcined defluorinated product, and after decomposition of practically all of the sulphate therein has been effected, the mol ratio lies between about 3.2 and about 3.4 computed on the basis of the above-stated equation. Since phosphate rock from different sources varies in its acid requirement, no set rule is entirely reliable for estimating the amount of phosphoric acid required. The important point is that the amount of phosphoric acid added must not be sufficient to reduce the mol ratio to 3.1 or below in the final product, after the sulfuric acid has been eliminated in the calcination step, while on the other hand there must be enough added to permit effective and substantially complete fluorine removal during the calcination. The calcination is carried out at temperatures of between about 1275° C. and about 1450° C., preferably between about 1300 and about 1350° C. If the amount of phosphoric acid, usually orthophosphoric acid, added (no sulfuric acid being employed) to the phosphate rock is reduced sufficiently in order to produce after defluorination a mol ratio above 3.1, fluorine removal is retarded. In order to overcome this difficulty, a small amount of sulfuric acid is added. This may be employed in the process in a number of ways. A mixture of phosphoric and sulfuric acids may be added to the phosphate rock, or phosphoric acid may be added to the rock first and then followed by the addition of the required small amount of sulfuric acid. Alternatively, triple superphosphate may be added to the phosphate rock, followed by the addition of either sulfuric acid or cured superphosphate. In still another embodiment of the invention, phosphoric acid may be added to the phosphate rock and a small amount of sulfuric acid may be added in the form of cured superphosphate prepared from sulfuric acid and phosphate rock. Finally, phosphate rock may have added thereto the required amounts of triple superphosphate and superphosphate, the triple superphosphate having been prepared by treating phosphate rock with phosphoric acid, and the superphosphate having been prepared by treating phosphate rock with sulfuric acid. Preferably, it is desired to mix the acids in a mixer along with the phosphate rock while stirring the mixture to obtain a thoroughly mixed material. Preferably orthophosphoric acid of about 60° Baumé and sulfuric acid of about 60° Baumé are employed, since this gives a mixture which is rather dry and pulverulent and may be readily screened and handled immediately after mixing. The pulverulent material after mixing may be directly subjected to calcination, but preferably at least one hour is allowed to elapse between the preparation of the mixture and the time when it is subjected to calcination. From one to twenty-four hours' standing of the mixture is generally practiced before subjecting the same to calcination. Less concentrated acids may be employed, but in such case the treating operation in the final mixture may require drying before milling, screening and calcination. If available, of course, more highly concentrated acids may be employed, but in general these are too expensive and are not actually required in order to successfully operate the process of the present invention.

In general, a phosphate rock having a B. P. L.

content of about between 70 and about 78% will require between about 0.30 and about 0.50 mol $H_3PO_4$, or its equivalent of phosphatic material, for example, triple superphosphate, and between 0.25 and about 0.50 mol of sulfuric acid or its equivalent of a sulfuric acid material, for example, superphosphate, for every mol of $P_2O_5$ in the phosphate rock. The term "phosphatic material" as used in this specification and accompanying claims is intended to refer to orthophosphoric acid or phosphate rock reacted with orthophosphoric acid, for example, triple superphosphate. The expression "sulfuric acid material" as used in this specification and claims is intended to refer to sulfuric acid or phosphate rock reacted with sulfuric acid, for example, superphosphate.

In order to give a fuller understanding of the present invention, but with no intention to be limited thereto, the following specific examples are given to illustrate the character of the invention herein described:

*Example 1*

A Florida phosphate rock containing about 34.5% $P_2O_5$ was ground to such a size that all of it passed through a 100 mesh screen. To 100 grams of this rock there was added about 17.168 grams of 40° Baumé $H_3PO_4$ (60° F.) amounting to about 6.85 grams $P_2O_5$ and about 20.57 grams of 40° Baumé sulfuric acid (60° F.), giving about 9.896 grams of $H_2SO_4$. The mixture was screened to pass through a 20 mesh sieve. This mixture had the following composition:

| | Per cent |
|---|---|
| $P_2O_5$ | 30.02 |
| CaO | 35.84 |
| MgO | 0.15 |
| $Na_2O$ | 0.15 |
| $K_2O$ | 0.07 |
| $Fe_2O_3$ | 0.81 |
| $Al_2O_3$ | 0.83 |
| F | 2.80 |
| $SO_3$ | 5.87 |

After standing for about 24 hours, the mixture was heated in a calciner to a temperature of about 1400° C. for a period of 30 minutes, while passing in contact therewith a stream of air having a relative humidity of about 59% measured at 78° F. Upon cooling, the final product showed the following analysis:

| | Per cent |
|---|---|
| $P_2O_5$ | 42.81 |
| CaO | 50.98 |
| MgO | 0.21 |
| $Na_2O$ | 0.21 |
| $K_2O$ | 0.10 |
| $Fe_2O_3$ | 1.15 |
| $Al_2O_3$ | 1.19 |
| F | 0.017 |
| $SO_3$ | 0.10 |
| $P_2O_5$ as orthophosphate | 42.81 |
| Mol ratio | 3.24 |
| Citrate insol. $P_2O_5$ | 14.80 |
| Available $P_2O_5$ | [1] 28.01 |

[1] Equivalent to 65.4% citrate solubility.

It will be noted that all the sulfuric acid added to the raw material was driven off during the calcination, thus giving a final mol ratio of 3.24 computed on the basis of the hereinbefore stated equation. Had no sulfuric acid been employed in this mixture, fluorine elimination would have been retarded; while had substantially more phosphoric acid been employed, the final mol ratio, computed on the above stated basis, would have been substantially below 3.10.

In another run employing the same feed material as set forth in Example 1, it was found that 6.165 grams of $P_2O_5$ as free phosphoric acid was sufficient to give the desired results.

This run was carried out in which the amount of phosphoric acid figured on the basis of grams $P_2O_5$ and the amount of sulfuric acid in grams were used to treat the same phosphate rock as described in Example #1 as follows:

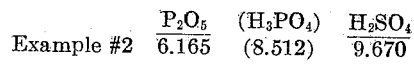

Example #2 $\overline{6.165}$ (8.512) $\overline{9.670}$

This mixture was then screened to pass through a 20 mesh sieve and was calcined at about 1400° C. for about 30 minutes while being contacted with air having a humidity of about 58% at 79° F. After the calcination, the product had the following analysis:

| | Per cent |
|---|---|
| $P_2O_5$ | 42.38 |
| CaO | 51.44 |
| MgO | 0.21 |
| $Na_2O$ | 0.21 |
| $K_2O$ | 0.10 |
| $Fe_2O_3$ | 1.16 |
| $Al_2O_3$ | 1.20 |
| Fluorine | 0.068 |
| $SO_3$ | 0.03 |
| $P_2O_5$ as orthophosphate | 42.38 |
| Mol ratio | 3.31 |
| Citrate insoluble $P_2O_5$ | 13.16 |
| Available $P_2O_5$ | [1] 29.22 |

[1] Equivalent to 69% citrate solubility.

The percentage of orthophosphate in the final product was determined as follows:

Weigh 0.4 gram sample (—40 mesh) into a 600 ml. beaker. Add 400 ml. of 0.4% HCl solution and stir for 2 hours at 98–99° F. Pour into a 500 ml. volumetric flask and make to mark with water. Shake to mix and filter. Pipette 100 ml. (equivalent to 0.08 gram) into each of two 250 ml. beakers. Add immediately 30 ml. ammonium nitrate solution (40%), 40–45 ml. ammonium molybdate solution and stir one of the beakers for 20 minutes, and the other for 40 minutes at room temperature (30° C.). Filter off and wash the yellow precipitate immediately as each beaker is removed from the stirrer.

Titrate for percentage of $P_2O_5$ in the usual way. Ml. of .3238 N NaOH required × 1.25 = % $P_2O_5$.

Deduct the result obtained by the 20 minute stirring period from the result representing the 40 minute period (to obtain percentage $P_2O_5$ representing the amount of orthophosphate formed by hydrolysis under the conditions in 20 minutes) and subtract this result from the result for the 20 minute stirring period to obtain percentage $P_2O_5$ in the sample as soluble orthophosphate. NOTE.—This method is based on the fact that meta and pyrophosphates are not precipitated by ammonium molybdate and that the rate of change to the ortho form in .4% HCl solution at 98–99° F., is extremely slow.

Having now thus fully described and illustrated the character of the invention, what is desired to be secured by Letters Patent is:

1. An improved process for producing from phosphate rock an animal feed ingredient containing at least 30% $P_2O_5$ and containing an amount of fluorine not more than about 1/300 part of the P₂O₅ which comprises mixing phosphate rock with a phosphatic material selected from the group consisting of orthophosphoric acid and phosphate rock reacted with orthophosphoric acid and a sulfuric acid material selected from the group consisting of sulfuric acid and phosphate rock reacted with sulfuric acid, said sulfuric acid material having its equivalent in mols of sulfuric acid not exceeding the equivalent in mols of phosphoric acid contained in the phosphatic material employed, treating said mixture at a temperature between about 1275° C. and about 1450° C. so that substantially all of the sulfur and fluorine are removed, the amount of added material being such that in the final product the mol ratio $$\frac{\text{Mols of CaO+Mgo+Na}_2\text{O+K}_2\text{O}}{\text{Mols of P}_2\text{O}_5-\text{Fe}_2\text{O}_3-\text{Al}_2\text{O}_3}$$

is above about 3.2, but below 3.4.

2. The improved process for producing an animal feed ingredient containing not less than about 30% of P₂O₅, substantially all of which is in the form of orthophosphate, and at least 50% of the P₂O₅ content being ammonium citrate soluble, while containing an amount of fluorine not more than about 1/300 part of the P₂O₅ content, which comprises grinding phosphate rock to a fine powder, admixing therewith a mixture of orthophosphoric acid and sulfuric acid, said sulfuric acid being added in an amount of at least about .25 mol of sulfuric acid per mol of P₂O₅ content but not exceeding an amount in mols equal to the mols of orthophosphoric acid employed, calcining the mixture at a temperature of between about 1275° C. and about 1450° C., while actively agitating the same, and while in the presence of water vapor, only sufficient phosphoric acid being added so that in the final product the mol ratio $$\frac{\text{Mols of CaO+Mgo+Na}_2\text{O+K}_2\text{O}}{\text{Mols of P}_2\text{O}_5-\text{Fe}_2\text{O}_3-\text{Al}_2\text{O}_3}$$

is above about 3.2, but below 3.4.

3. The improved process for producing an animal feed ingredient containing not less than about 30% of P₂O₅, substantially all of which is in the form of orthophosphate, and at least 50% of the P₂O₅ content being ammonium citrate soluble, while containing an amount of fluorine not more than about 1/300 part of the P₂O₅ content, which comprises grinding phosphate rock to a fine powder, admixing a mixture comprising orthophosphoric acid and sulfuric acid, said sulfuric acid being added in an amount of at least about .25 mol of sulfuric acid per mol of P₂O₅ content but not exceeding an amount in mols equal to the mols of phosphoric acid employed, calcining the mixture for a period of at least 30 minutes at a temperature of between about 1275° C. and 1450° C., while actively agitating the same and in the presence of air containing appreciable amounts of water vapor, only sufficient phosphoric acid being added so that in the final product the mol ratio $$\frac{\text{Mols of CaO+Mgo+Na}_2\text{O+K}_2\text{O}}{\text{Mols of P}_2\text{O}_5-\text{Fe}_2\text{O}_3-\text{Al}_2\text{O}_3}$$

is above about 3.2, but below 3.4.

4. The improved process for producing an animal feed ingredient containing at least 40% P₂O₅, substantially all of which is in the form of orthophosphate, at least 50% of the P₂O₅ content being soluble in ammonium citrate and containing an amount of fluorine not more than about 1/300 part of the P₂O₅ content thereof, which comprises grinding phosphate rock to a relatively fine size, mixing with the ground rock between about 0.30 and about 0.50 mol of orthophosphoric acid, and between about 0.25 and about 0.50 mol of sulfuric acid per mol of P₂O₅ content of the ground phosphate rock, calcining the mixture of temperatures at between about 1275° C. and about 1450° C., while actively agitating the same, the specific molar amount of phosphoric acid being adjusted so that in the final product, after substantially all of the sulfur and fluorine have been driven off, the mol ratio $$\frac{\text{Mols of CaO+Mgo+Na}_2\text{O+K}_2\text{O}}{\text{Mols of P}_2\text{O}_5-\text{Fe}_2\text{O}_3-\text{Al}_2\text{O}_3}$$

is above about 3.2, but below 3.4.

5. The process which comprises admixing with a ground Florida phosphate rock containing about 34.5% P₂O₅ and passing through a 100 mesh screen orthophosphoric acid corresponding to 6.85 grams P₂O₅ and about 9.89 grams H₂SO₄, each amount being per 100 grams of phosphate rock treated, screening the mixture through a 20 mesh screen, heating the same at a temperature of about 1400° C. for a period of about 30 minutes while passing in contact therewith a current of air of about 59% relative humidity measured at 78° F. to give a final product having a mol ratio $$\frac{\text{Mols of CaO+Mgo+Na}_2\text{O+K}_2\text{O}}{\text{Mols of P}_2\text{O}_5-\text{Fe}_2\text{O}_3-\text{Al}_2\text{O}_3}$$

of about 3.24 and a citrate solubility of P₂O₅ content of about 65.4%.

CHARLES A. BUTT.

REFERENCES CITED

The following references are of record in the file of this patent:

UNITED STATES PATENTS

| Number | Name | Date |
|---|---|---|
| Re. 22,500 | Shoeld | June 20, 1944 |
| 1,034,090 | Dunham | July 30, 1912 |
| 1,994,070 | Foss | Mar. 12, 1935 |
| 2,337,498 | Ritter | Dec. 21, 1943 |
| 2,442,969 | Butt | June 8, 1948 |

FOREIGN PATENTS

| Number | Country | Date |
|---|---|---|
| 13,891 | Great Britain | 1911 |
| 453,646 | Great Britain | Sept. 11, 1926 |